(12) United States Patent
Ishizuka (10) Patent No.: US 9,049,150 B2
(45) Date of Patent: Jun. 2, 2015

(54) COMMUNICATION SYSTEM, CONTROL APPARATUS, NODE CONTROLLING METHOD AND NODE CONTROLLING PROGRAM

(75) Inventor: Eiichi Ishizuka, Tokyo (JP)

(73) Assignee: NEC Corporation, Tokyo (JP)

( * ) Notice: Subject to any disclaimer, the term of this patent is extended or adjusted under 35 U.S.C. 154(b) by 137 days.

(21) Appl. No.: 13/806,715

(22) PCT Filed: Jun. 20, 2011

(86) PCT No.: PCT/JP2011/064080
§ 371 (c)(1),
(2), (4) Date: Dec. 21, 2012

(87) PCT Pub. No.: WO2011/162215
PCT Pub. Date: Dec. 29, 2011

(65) Prior Publication Data
US 2013/0100951 A1 Apr. 25, 2013

(30) Foreign Application Priority Data
Jun. 23, 2010 (JP) ................................ 2010-142511

(51) Int. Cl.
*H04L 12/28* (2006.01)
*G06F 15/177* (2006.01)
(Continued)

(52) U.S. Cl.
CPC ............... *H04L 45/56* (2013.01); *H04L 47/20* (2013.01); *H04L 12/44* (2013.01)

(58) Field of Classification Search
USPC ................. 370/235–252, 328–352, 392–401; 709/217–227, 238–246
See application file for complete search history.

(56) References Cited

U.S. PATENT DOCUMENTS 7,417,990 B2 * 8/2008 Ikeda et al. .................... 370/390
7,471,683 B2 * 12/2008 Maher et al. .................. 370/392

(Continued)

FOREIGN PATENT DOCUMENTS

| CN | 1761238 A | 4/2006 |
| JP | 2003-348148 A | 12/2003 |

(Continued)

OTHER PUBLICATIONS

European Search Report dated Dec. 13, 2013.
(Continued)

*Primary Examiner* — Man Phan
(74) *Attorney, Agent, or Firm* — McGinn IP Law Group, PLLC (57) ABSTRACT

A controller connected to a node configured for processing a packet received in accordance with a processing rule that stipulates a matching rule and processing for a packet matching to the matching rule includes a removal request history management unit, a processing rule search unit and a processing rule setting unit. The removal request history management unit retains record(s) of requests made to the node(s) in connection with removing the processing rule. The processing rule search unit references, in setting a new processing rule for the node, the removal request history management unit to search for a processing rule having a matching rule that competes with the new processing rule. The processing rule setting unit re-requests, in case a processing rule having a matching rule competing with the new processing rule exists in the removal request history management unit, the node(s) to remove the processing rule having the matching rule competing with the new processing rule.

8 Claims, 8 Drawing Sheets

(51) Int. Cl.
*H04L 12/771* (2013.01)
*H04L 12/813* (2013.01)
*H04L 12/44* (2006.01)

(56) References Cited

U.S. PATENT DOCUMENTS

| | | | | |
|---|---|---|---|---|
| 7,539,775 | B2* | 5/2009 | Rikitake et al. | 709/246 |
| 7,876,702 | B2* | 1/2011 | Imai | 370/252 |
| 8,295,284 | B1* | 10/2012 | Singh et al. | 370/392 |
| 2006/0039364 | A1* | 2/2006 | Wright | 370/352 |
| 2006/0056412 | A1 | 3/2006 | Page | |
| 2007/0204060 | A1* | 8/2007 | Higuchi et al. | 709/234 |
| 2009/0138577 | A1* | 5/2009 | Casado et al. | 709/220 |
| 2011/0231545 | A1* | 9/2011 | Enomoto et al. | 709/224 |

FOREIGN PATENT DOCUMENTS

| | | |
|---|---|---|
| WO | WO 2007/030742 A1 | 3/2007 |
| WO | WO 2010/064532 A1 | 6/2010 |

OTHER PUBLICATIONS

"OpenFlow Switch Specification" Version1.0.0 (Wire Protocol 0×01), retrieved Heisei22 (2010) May 26, Internet <URL: http://www.openflowswitch.org/documents/openflow-spec-v1.1.0.pdf (periovusly submitted on Dec. 21, 2012).

International Search Report in PCT/JP2011/064080 dated Sep. 20, 2011 (English Translation Thereof).

Nick McKeown and seven others, "OpenFlow: Enabling Innovation in Campus Networks", [on-line], retrieved Heisei22 (2010) May 26, Internet <URL: http://www.openflowswitch.org//documents/openflow-wp-latest.pdf>.

"OpenFlow Switch Specification" Version1.0.0 (Wire Protocol 0×01), retrieved Heisei22 (2010) May 26, Internet <URL: http://www.openflowswitch.org/documents/openflow-spec-v1.1.0.pdf.

Yoshihiko Kanaumi, et al., "BS-10-4 The Demonstration experience of OpenFlow on JGN2plus", Proceedings of the 2009 IEICE General Conference, Tsushin 2, Mar. 4, 2009, pp. S-135 to S-136.

Chinese Office Action dated Oct. 10, 2014 with an English Translation thereof.

* cited by examiner

| NAMES OF ACTIONS | CONTENTS OF ACTIONS |
|---|---|
| OUTPUT | OUTPUT AT SPECIFIED PORT |
| SET_VLAN_VID | ADD AND UPDATE VLAN Tag WITH SPECIFIED VLAN ID |
| SET_VLAN_PCP | ADD AND UPDATE VLAN Tag WITH SPECIFIED VLAN Priority |
| STRIP_VLAN | STRIP IEEE802.1q VLAN Tag |
| SET_DL_SRC | UPDATE MAC SA |
| SET_DL_DST | UPDATE MAC DA |
| SET_NW_SRC | UPDATE IP SA |
| SET_NW_DST | UPDATE IP DA |
| SET_TP_SRC | UPDATE TCP/UDP Source Port |
| SET_TP_DST | UPDATE TCP/UDP Destination Port |
| ENQUEUE | OUTPUT TO SPECIFIED QUEUE |
| VENDOR | VENDER DEFINED ACTION |

COMMUNICATION SYSTEM, CONTROL APPARATUS, NODE CONTROLLING METHOD AND NODE CONTROLLING PROGRAM

CROSS-REFERENCE TO RELATED APPLICATIONS

This application is based upon and claims the benefit of the priority of Japanese patent application No. 2010-142511 filed on Jun. 23, 2010, the disclosure of which is incorporated herein in its entirety by reference thereto.

This invention relates to a communication system, a controlling apparatus, a node controlling method and a computer-readable storage medium storing a node controlling program. More specifically, it relates to a communication system including a node that processes a received packet in accordance with a processing rule having a matching rule matched to the received packet, a controlling apparatus, a node controlling method and a computer-readable storage medium corresponding program.

BACKGROUND

Technical Field

Figure 7:
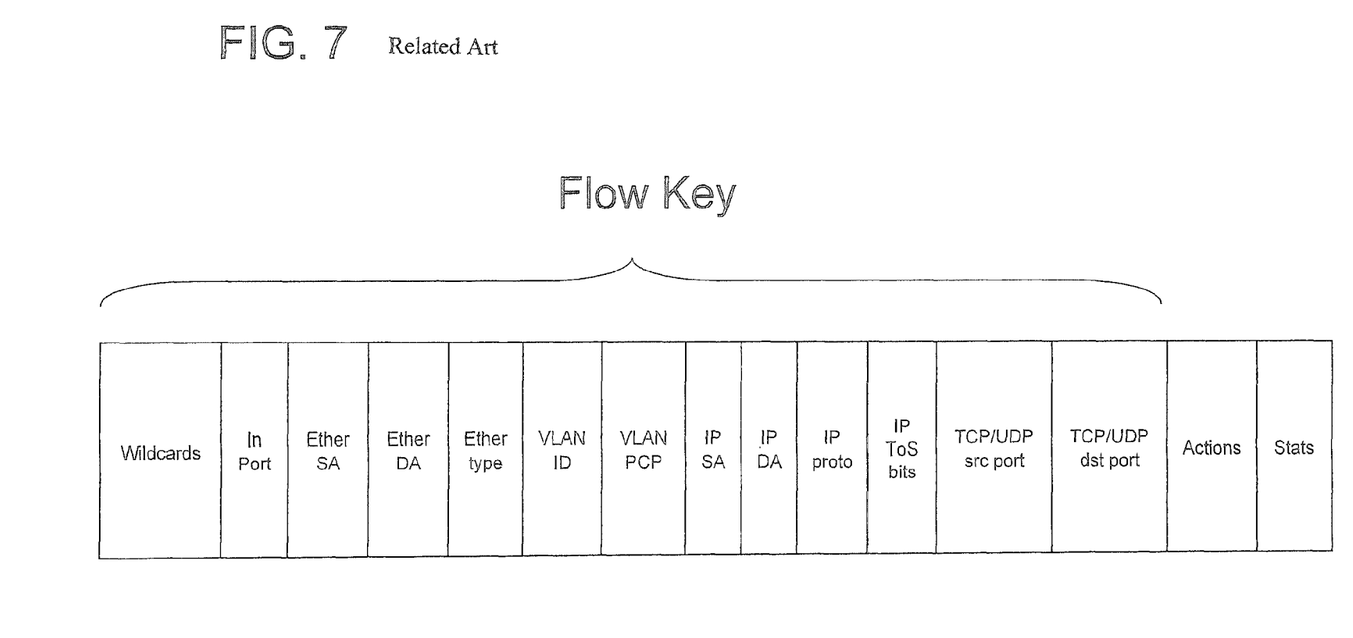
FIG. 7 is a diagram showing a configuration of a flow entry appearing in Non-Patent Publication 2.

Recently, a technique called OpenFlow has been proposed (see Non-Patent Literatures 1 and 2). The OpenFlow grasps communication as end-to-end flow and effectuates path control and recovery from faults as well as load balancing and optimization on the flow-by-flow basis. The OpenFlow switch, operating as a forwarding node, includes a secure channel for communication with an OpenFlow controller, taken to be a control apparatus, and is in operation in accordance with a flow table commanded from time to time by the OpenFlow controller for addition or rewriting. In the flow table, a plurality of sets each formed by a matching rule (Flow key/matching key) to match with a packet header, an action (Actions) that gives definition of processing contents, and the flow statistic information (Stats), are defined on the flow-by-flow basis (see FIG. 7).

Figure 8:
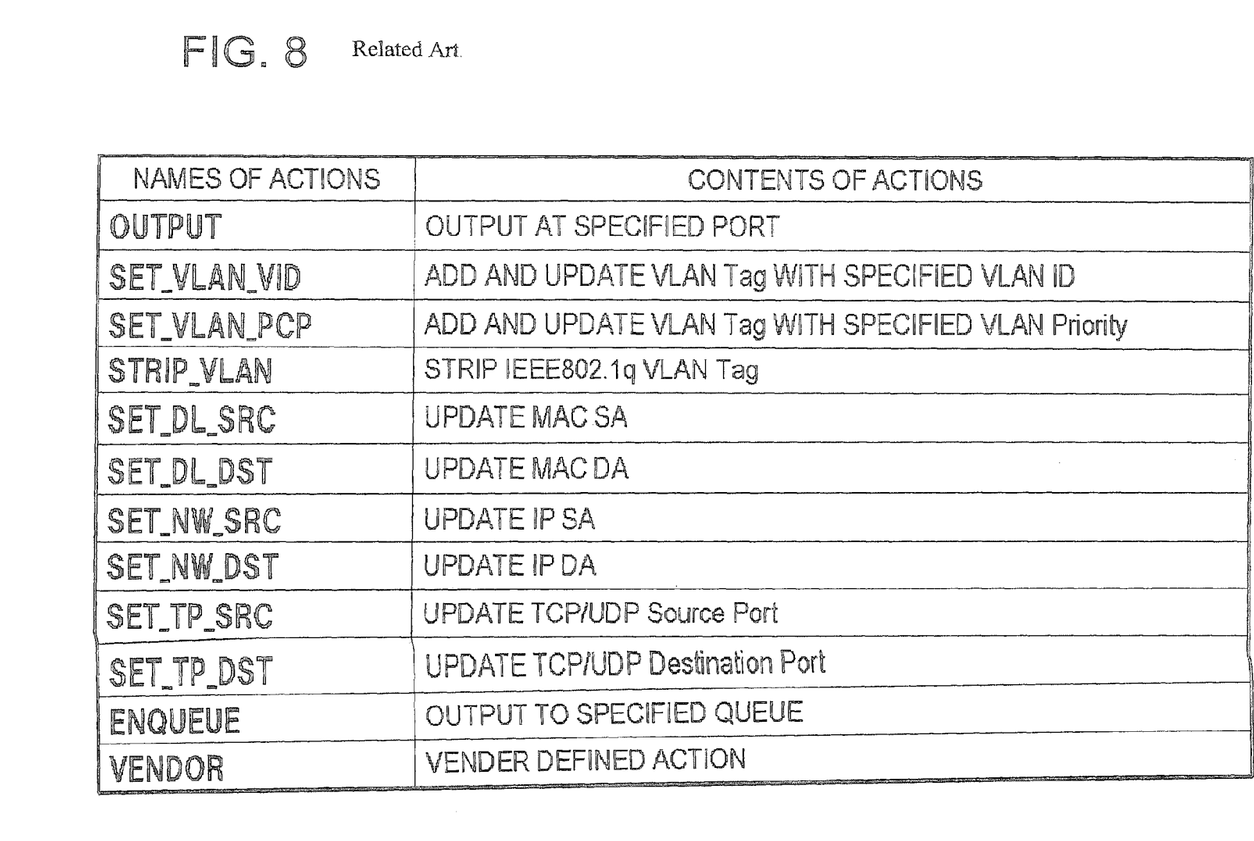
FIG. 8 is a diagram showing names and contents of actions appearing in Non-Patent Publication 2.

FIG. 8 shows, in a tabulated form, names and contents of actions as defined in the Non-Patent Publication 2 as an example. OUTPUT is an action to output a packet at a specified port (interface). SET_VLAN_VID through to SET_TP_DST are actions that modify fields of the packet header.

For example, if a first packet has been received, the OpenFlow switch searches from the flow table an entry having a matching or collation rule (FlowKey) matching to the header information of the packet received. If, as a result of search, the entry that matches to the received packet is found, the OpenFlow switch performs processing contents stated in the action field of the entry concerned. If, on the other hand, the entry matching to the received packet has not been found as a result of the search, the OpenFlow switch forwards the received packet over the secure channel to the OpenFlow controller to request the OpenFlow controller to decide on a route for the packet based on a source as well as a destination of communication of the received packet. The OpenFlow switch receives a flow entry that may implement the route to update its flow table.

The OpenFlow controller of the above mentioned Non-Patent Literatures 1, 2 collects the flow statistic information (Stats) from the OpenFlow switch operating as described above. The OpenFlow controller is capable of dynamically setting the route (flow entries or processing rules implementing the route) for the individual OpenFlow switches, in response to a communication policy or prevailing network load states, to effectuate path control or load balancing suitable to the communication policy. The setting, modification or removal of the flow entries in the OpenFlow switch is performed by the OpenFlow protocol of the above mentioned Non-Patent Literatures 1, 2 (see [4.6 Flow Table Modification Messages of Non-Patent Literature 2).

Otherwise, Patent Literature 1 discloses an IP multi-cast control method in an IP multi-cast control system including a layer 3 device and a layer 2 switch. The layer 3 device includes an IP multi-cast table and a label multi-cast table, and the layer 2 switch includes the label multi-cast table. An output port of the layer 2 switch may be specified from the layer 3 device. In the IP multi-cast control method, processing is simplified so that it is only sufficient that a switch unit in the layer 2 device references the label multi-cast table. In addition, high-speed multicast is made possible. Specifically, such the layer 2 switch is disclosed in which, when a multi-cast frame, to which a multi-cast label has been donated, has been received, the label multi-cast table in the layer 3 device is referenced to decide on a send-out port from the multi-cast label. If it is stated and stored in the label multi-cast table that the multi-cast label is to be removed, a multi-cast frame is sent out, as the multi-cast label is removed.

PTL 1:
JP Patent Kokai Publication No. JP2003-348148A
NPL 1:
Nick McKeown and seven others, "OpenFlow: Enabling Innovation in Campus Networks", [on-line], retrieved Heisei22 (2010) May 26, Internet <URL: http://www.openflowswitch.org//documents/openflow-wp-latest.pdf>
NPL 2:
"OpenFlow Switch Specification" Version 1.0.0. (Wire Protocol 0x01), retrieved Heisei22 (2010) May 26, Internet <URL: http://www.openflowswitch.org/documents/openflow-spec-v1.1.0.pdf>

SUMMARY

The disclosures of the above Patent Literature and Non-Patent Literatures are incorporated by reference herein. The following analysis is made by the present invention. There are occasions wherein, as the setting, modification and removal of the flow entries (processing rules) in the OpenFlow switch are carried out repeatedly, unneeded flow entries (processing rules) are left over due to imperfect processing for removal thereof, such that status discrepancies between these flow entries (processing rules) left over and the flow entries (processing rules) of the OpenFlow switches grasped by the OpenFlow controller are produced. There is also fear that unforeseen actions, such as packet removal or header rewrite operation, may be carried out, or loop troubles may be produced, as a result of combinations of the flow entries (processing rules) that failed to be removed and the newly set flow entries (processing rules).

There is also known STP (Spanning Tree Protocol) or the like, as a technique to avoid a loop trouble. However, the flow entries (processing rules) that failed to be removed and are left over in the OpenFlow switch persist without being grasped by the OpenFlow controller side. It is thus not possible to reduce the probability of loop troubles caused by the combination of the persistent flow entries (processing rules) with the additional flow information set subsequently.

The present invention has been arrived at under the above mentioned situation. It is an object of the present invention to provide a communication system including a control apparatus (controller) configured for setting a processing rule (flow entry) in each node, such as an OpenFlow controller or an OpenFlow switch, wherein it is possible to suppress occurrences of unforeseen actions or loop troubles otherwise caused by status discrepancies between the flow entries (processing rules) grasped by the controller and those actually retained by the nodes. It is also aimed at by the present invention to provide a corresponding control apparatus (controller), a corresponding node controlling method and a corresponding program.

In a first aspect, there is provided a communication system including a node(s) and a control apparatus (controller). The node(s) processes a packet received in accordance with a processing rule that stipulates a matching rule and processing for a packet matching to the matching rule. The controller includes a removal request history management unit that retains record(s) of past request(s) to the node(s) to remove a processing rule; a processing rule search unit that, in setting a new processing rule for the node(s), references the removal request history management unit to search a processing rule having a matching rule competing with the new processing rule; and a processing rule setting unit that, in case a processing rule having the matching rule competing with the new processing rule exists, re-requests the node(s) to remove the processing rule having the matching rule competing with the new processing rule.

In a second aspect, there is provided a controller connected to a node(s) configured for processing a packet received in accordance with a processing rule that stipulates a matching rule and processing for a packet matching to the matching rule. The controller includes a removal request history management unit that retains record(s) of past request(s) to the node(s) to remove the processing rule; a processing rule search unit that, in setting a new processing rule for the node(s), references the removal request history management unit to search a processing rule having a matching rule that competes with the new processing rule; and a processing rule setting unit that, in case a processing rule having a matching rule competing with the new processing rule exists in the removal request history management unit, re-requests the node(s) to remove the processing rule having the matching rule competing with the new processing rule.

In a third aspect, there is provided a method for controlling a node(s) by a controller connected to the node(s), in which the node(s) is configured for processing a packet received in accordance with a processing rule stipulating a matching rule and processing of a packet matching to the matching rule, with the controller setting the processing rule for the node(s). The method includes retaining a record(s) of past request(s) to a node(s) to remove the processing rule; referencing, in setting a new processing rule for the node(s), the record(s) of past request(s) to the node(s) to remove the processing rule to search a processing rule having a matching rule competing with the new processing rule; and re-requesting, in case the processing rule having the matching rule competing with the new processing rule exists in the record(s), the node(s) to remove the processing rule having the matching rule competing with the new processing rule. The present method is associated with a particular machine, viz., a controller that sets a processing rule in the node(s).

In a fourth aspect, there is provided a computer-readable storage medium storing a program running on a computer forming a controller connected to a node(s) configured for processing a packet received in accordance with a processing rule stipulating a matching rule and processing of a packet matching to the matching rule, with the controller setting the processing rule for the node(s). The program includes a processing of retaining a record(s) of past request(s) to a node(s) to remove the processing rule; a processing of referencing, in setting a new processing rule for the node(s), the record(s) of past request(s) to the node(s) to remove the processing rule to search a processing rule having a matching rule competing with the new processing rule; and a processing of re-requesting, in case the processing rule having the matching rule competing with the new processing rule exists in the record(s), the node(s) to remove the processing rule having the matching rule competing with the new processing rule. The present program may be recorded on a computer-readable program product. That is, the present invention may be implemented as a computer program product.

The meritorious effects of the present invention re summarized as follows.

According to the present invention, it is possible to suppress occurrences of unforeseen actions or loop troubles otherwise caused by status discrepancies between the flow entries (processing rules) grasped by the controller and those actually retained by the node(s).

MODES

Figure 1:
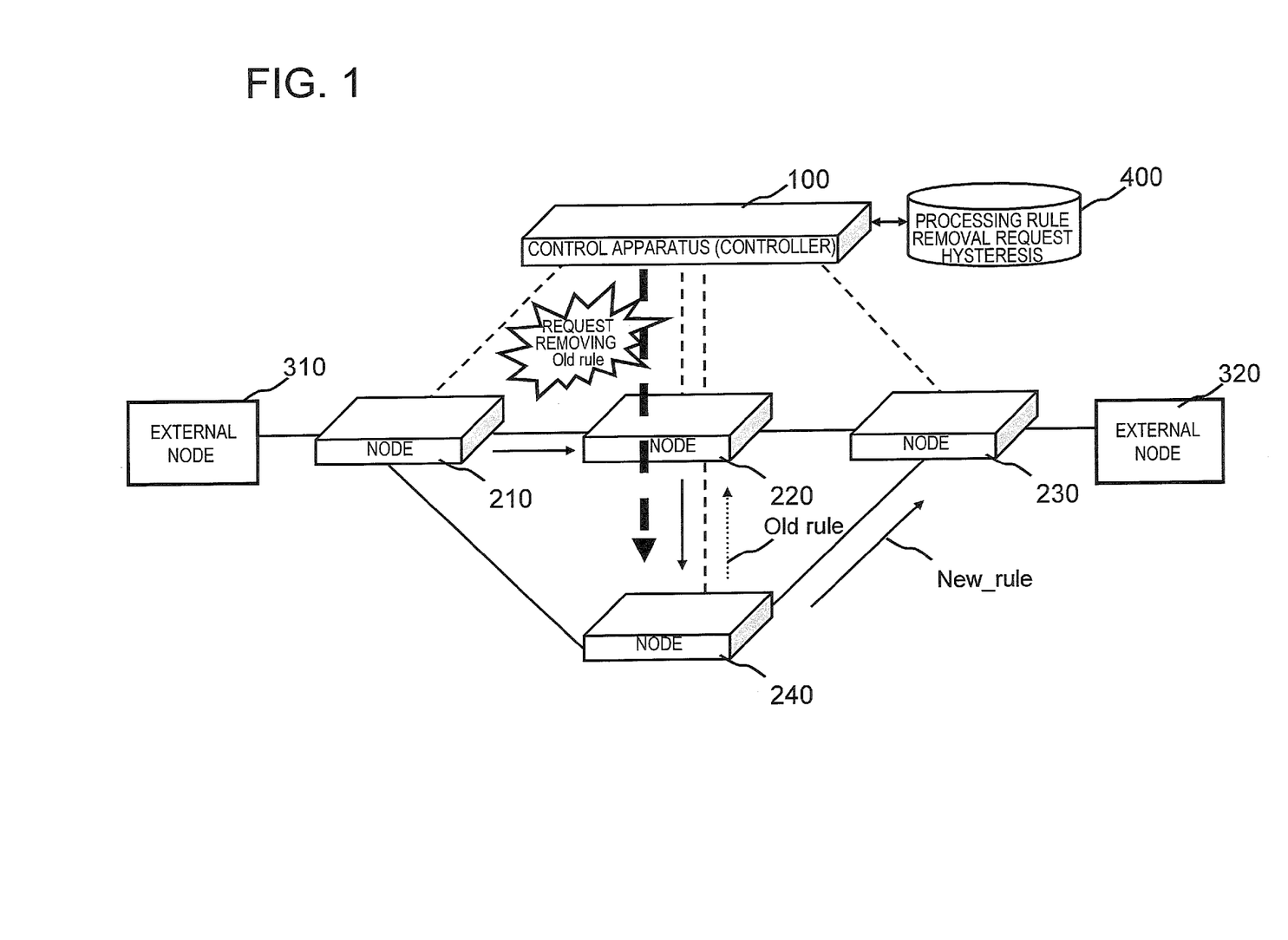
FIG. 1 is a schematic view for illustrating an outline of the present invention.

Initially, the outline of the present invention will be described with reference to FIG. 1. In a communication between external nodes 310 and 320, as communication end points of FIG. 1, a control apparatus (controller) 100 calculates a route by a set of nodes disposed in a network. In the example of FIG. 1, just nodes 210, 220, 230 and 240 are shown. The control apparatus (controller) 100 sets, in each of the nodes, a processing rule (flow entry) that implements the route.

It is now assumed that the control apparatus (controller) 100 has calculated a route to forward a packet in an order from the node 210, thence to the node 240, thence to the node 220 and thence to the node 230. It is also assumed that the control apparatus (controller) has set in the node 240 a processing rule to output a packet destined from an external node 310 to an external node 320 via a port thereof connected to the node 220 (Old rule).

It is moreover assumed that the control apparatus (controller) 100 then changes the forwarding route for the packet, destined from the external node 310 to the external node 320, to a route starting from the node 210 to the node 220, thence to the node 240 and thence to the node 230, based on loads on the nodes 210 to 240, a communication policy and/or so on. In this case, the processing rule retained on the node 240 (old rule) is removed and a new processing rule (new rule) is set.

It is furthermore assumed that the processing rule starting from the node 240 towards the node 220 (old rule) failed to be removed by some reason or other. In such case, the packet sent out from the external node 310 destined to the external node 320 meets a loop trouble between the nodes 220 and 240 due to combination of the old rule with the processing rule now set in the node 220 to forward the packet in question in the direction from the node 220 to the node 240.

Thus, the control apparatus (controller) 100 manages the record(s) of past request(s) made to the node(s) to remove the processing rule(s) (flow entry(s)). Moreover, in setting a new processing rule (flow entry), the control apparatus (controller) searches, from the history (records), the processing rule (flow entry) that competes with the new processing rule (flow entry) and that has failed to be removed. The control apparatus (controller) thus again requests the node 240 to remove the competing processing rule (flow entry), by way of a re-request for removal of the old rule. In this manner, the processing rule (Old rule) is removed so that the probability of occurrence of loop troubles due to the old rule combined with the new processing rule (flow entry) starting from the node 220 to the node 240 is decreased.

In this manner, the processing rule (flow entry) retained by the node 240 matches to the contents grasped by the control apparatus (controller) 100 to render it possible to suppress the occurrences of loop troubles.

In the above example, the case of occurrence of a loop trouble has been taken up for explanation. However, such a situation in which unforeseen actions, such as packet removal or header rewrite operation, should take place due to duplicated setting, in a certain node, of two processing rules (flow entries) with competing matching rules (matching keys) may also be suppressed from occurring as a result of the above mentioned re-request for removal of the processing rule (flow entry).

Exemplary Embodiment 1

Figure 2:
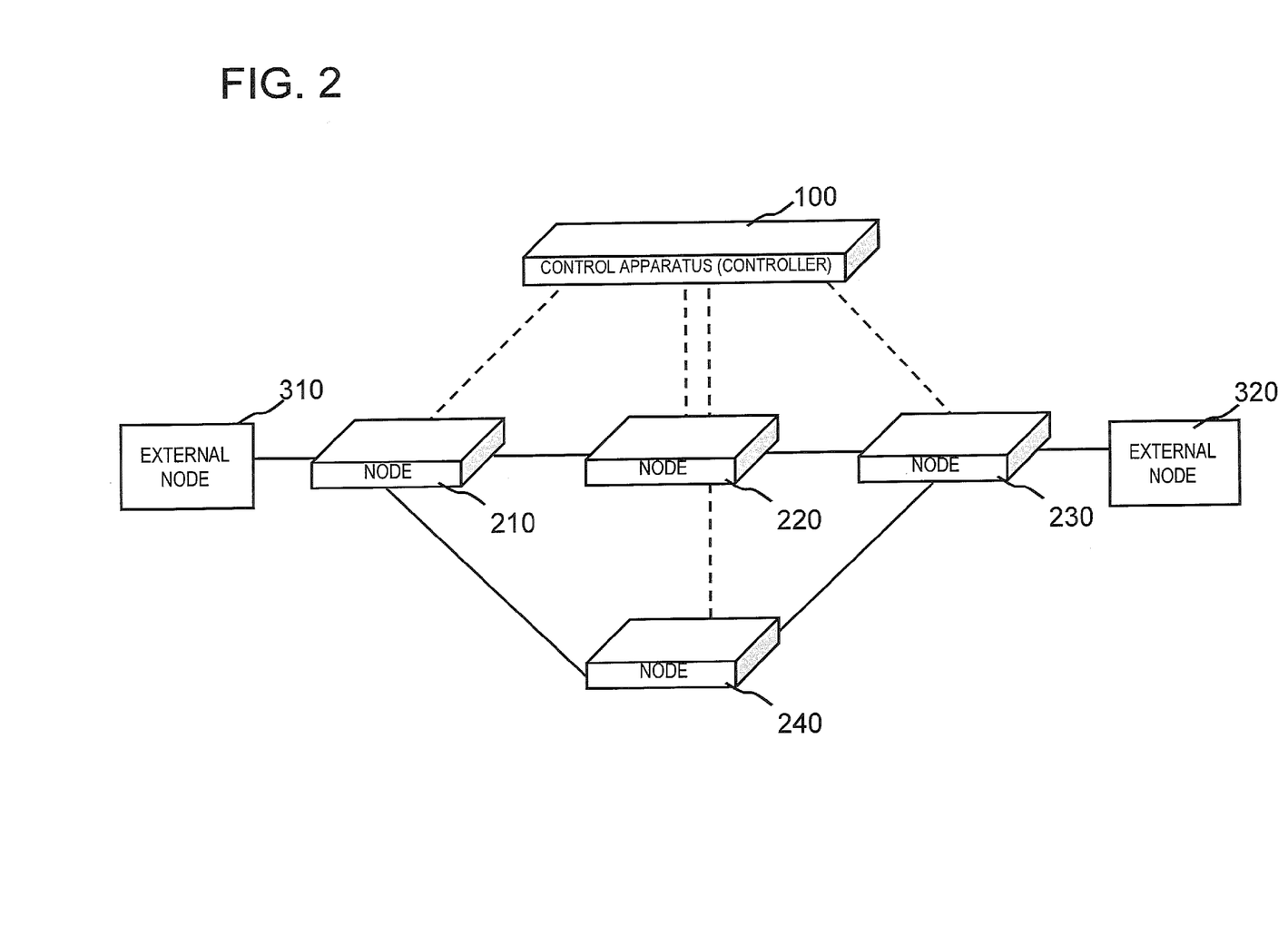
FIG. 2 is a schematic view showing a configuration of exemplary embodiment 1 of the present invention.

FIG. 2 depicts a configuration of an exemplary embodiment 1 of the present invention. Referring to FIG. 2, the configuration includes a plurality of nodes (nodes 210, 220, 230 and 240), a control apparatus (controller) 100 for setting processing rules (flow entries) in these nodes, and external nodes 310, 320. The nodes 210 to 240 are disposed in a network to process a packet in accordance with the processing rules (flow entries).

Figure 3:
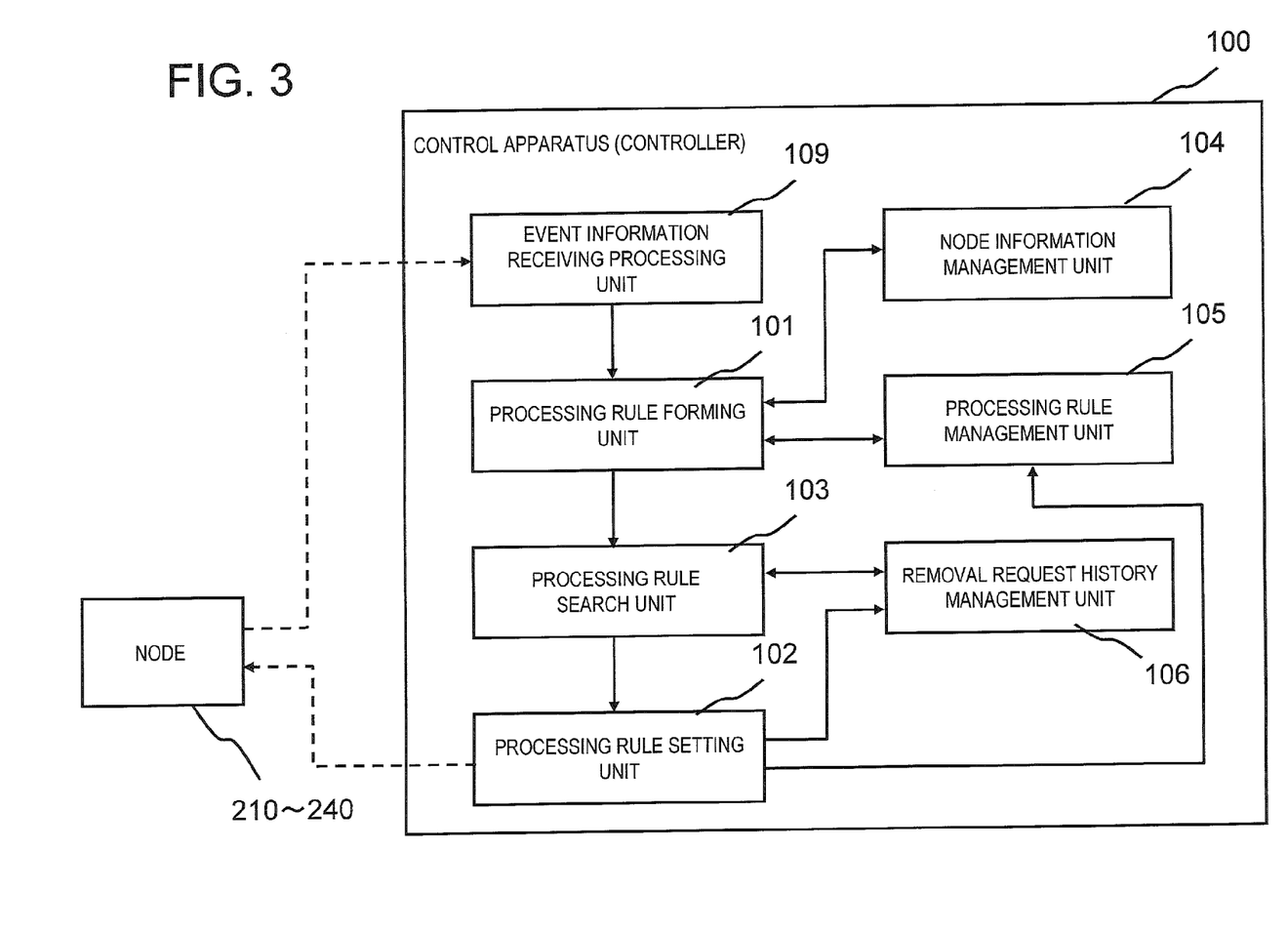
FIG. 3 is a block diagram showing a configuration of a control apparatus (controller) according to exemplary embodiment 1 of the present invention.

FIG. 3 depicts a block diagram showing a detailed configuration of the control apparatus (controller) 100 shown in FIG. 2. Referring to FIG. 3, the control apparatus (controller) 100 includes a processing rule forming unit 101, a processing rule setting unit 102, a processing rule search unit 103, a node information management unit 104, a processing rule management unit 105, a removal request history management unit 106 and an event information receiving processing unit 109.

The processing rule forming unit 101 forms a processing rule (flow entry) in response to a request from a node. More specifically, if a processing rule (flow entry) matched to a packet, a subject of the request from the node, is retained in the processing rule management unit 105, the processing rule forming unit 101 outputs the processing rule (flow entry), as already set, to the processing rule search unit 103. If conversely the processing rule (flow entry) matched to the packet, a subject of the request from the node, is not retained in the processing rule management unit 105, the processing rule forming unit 101 calculates a forwarding route for the packet, for which no processing rule (flow entry) has been set, by referencing a communication policy retained in the node information management unit 104 or communication load information in each of the nodes disposed in the network. The processing rule forming unit forms the processing rule (flow entry) that implements the forwarding route to output the so formed processing rule (flow entry) to the processing rule search unit 103.

The processing rule search unit 103 searches, from the removal request history management unit 106, a processing rule (flow entry) whose request for removal has already been requested. The processing rule (flow entry), thus already requested for removal, may produce a loop trouble in combination with the processing rule (flow entry) output from the processing rule forming unit 101. This search may be accomplished by searching, from processing rules (flow entries) for the subject node, already requested for removal and retained in the removal request history management unit 106, the processing rule having the matching rule (matching key) competing with a new processing rule (flow entry) formed by the processing rule forming unit 101. If, as a result of the search, the processing rule (flow entry), which has already been requested for removal and which is in need of a re-request for removal, is found, the processing rule setting unit 102 again requests the subject node, via the processing rule search unit 103, to remove the processing rule (flow entry).

The processing rule setting unit 102 requests the subject node to additionally set the new processing rule (flow entry), formed by the processing rule forming unit 101, and to remove the processing rule (flow entry) that has become unneeded or the like. In case the processing rule setting unit 102 has made a request to remove the processing rule (flow entry), which has become unneeded, the processing rule setting unit adds an item of removal record to the removal request history management unit 106. The processing rule setting unit 102 also updates the contents of the processing rule management unit 105 in response to the additional setting or removal of the processing rule.

The node information management unit 104 manages the communication policy regarding the setting of the processing rule (flow entry), while also managing the communication load information at each node disposed in the network. The node information management unit 104 may be formulated so as to cause to retain the relationship of interconnections of the respective nodes (topological information) to enable the processing rule forming unit 101 to reference not only the communication policy and the communication load but also the topological information to form the packet forwarding route.

The processing rule management unit 105 manages the processing rule (flow entry) set in each node in response to a request for additional setting as well as a request for removal of the processing rule (flow entry) made by the processing rule setting unit 102. If the processing rule (flow entry) for a packet, the setting of which has been recognized as not having been made and hence has been requested, is retained in the processing rule management unit 105, the processing rule forming unit 101 may read out the processing rule (flow entry) from the processing rule management unit 105 to re-use it.

The removal request history management unit 106 manages the processing rule (flow entry) whose request for removal has been made by the processing rule setting unit 102, as history record.

The event information receiving processing unit 109 receives a processing rule setting request from each node as the event information and forwards it to the processing rule forming unit 101.

As set out above, the control apparatus (controller) 100 retains, as history records, the processing rule (flow entry) which it requested a certain node to remove. If there is such processing rule (flow entry) that, when combined with a new processing rule (flow entry), may give rise to a loop trouble, the control apparatus (controller) re-requests the node in question to remove the subject processing rule (flow entry).

The control apparatus (controller) 100, described above, may be implemented by a configuration of an OpenFlow controller of the Non-Patent Publication 1 or 2, as basis, with addition of the processing rule search unit 103 and the removal request history management unit 106.

The various parts of the control apparatus (controller) 100, set out above, may be implemented by a program executed by a computer making up the control apparatus (controller) 100, using its hardware resources including a storage device. The program is to be so designed as to retain the processing rule (flow entry) whose request for removal has already been made, or to search the processing rule (flow entry) whose request for removal is to be made again, or the like.

In the present exemplary embodiment, the nodes 210, 220, 230 and 240 of FIGS. 2 and 3 are assumed to be the OpenFlow switches of the Non-Patent Literatures 1 and 2. However, other switches or routers etc. may also be used, provided that these possess equivalent functions.

Figure 4:
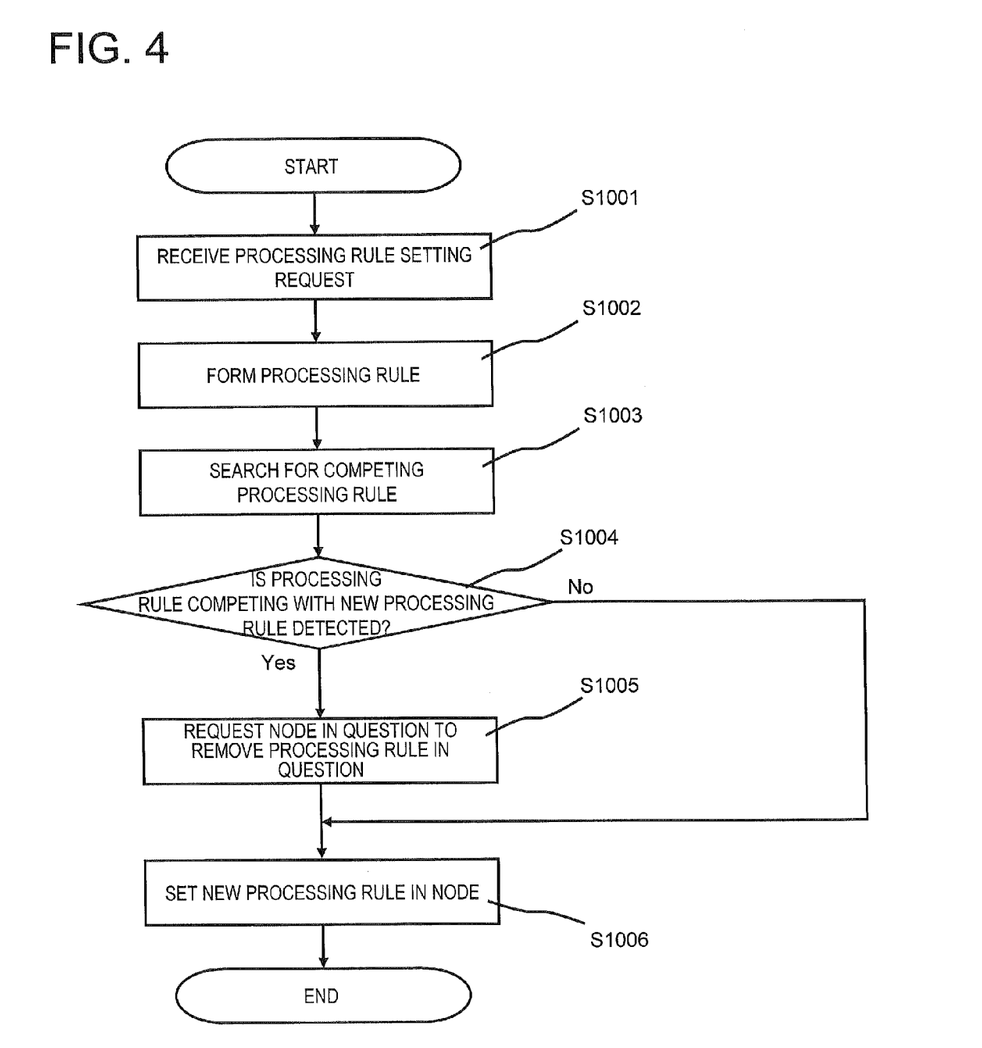
FIG. 4 is a flowchart showing the operation of the control apparatus (controller) according to exemplary embodiment 1 of the present invention.

The operation of the present exemplary embodiment will now be stated in detail with reference to the drawings. FIG. 4 is a flowchart illustrating operation of the control apparatus (controller) of exemplary embodiment 1 of the present invention.

Initially, when the external node 310 as a communication end point has commenced communication with the external node 320, the processing rule (flow entry) for delivery of the packet from the external node 310 to the external node 320 is not set in the node set disposed in the network. The node set is composed in the present exemplary embodiment by just the nodes 210, 220, 230 and 240. The control apparatus (controller) 100 receives, in this case, a request for setting a processing rule (flow entry) (Packet-In), along with a packet, from the node 210 which initially received the packet from the external node 310 (step S1001).

On receipt of the setting request of the processing rule (flow entry), the processing rule forming unit 101 of the control apparatus (controller) 100 forms a processing rule (flow entry) for the packet, as requested from the node, by referencing a communication policy retained by the node information management unit 104 or communication load information in each node disposed in the network (step S1002). It is observed that, if the processing rule (flow entry) for the packet, as requested from the node, is retained in the processing rule management unit 105, it is sufficient to use the processing rule (flow entry) retained by the processing rule management unit 105.

The processing rule forming unit 101 of the control apparatus (controller) 100 references the communication policy stored in the node information management unit 104 or the communication load information of each node disposed in the network to calculate the packet forwarding route. The processing rule forming unit also forms the processing rule (flow entry) that implements the forwarding route to output the so formed processing rule to the processing rule search unit 103.

On receipt of the processing rule (flow entry) from the processing rule forming unit 101, the processing rule search unit 103 of the control apparatus (controller) 100 checks the processing rules (flow entries) contained in the removal request history management unit 106 in search for the processing rule (flow entry) whose request for removal has already been made and whose matching rule competes with that of the processing rule (flow entry) received. Such processing rule (flow entry), if combined with the processing rule (flow entry) received, will produce a network trouble or the like (step S1003).

If no processing rule (flow entry), which competes with the processing rule (flow entry) output from the processing rule forming unit 101 and a request for removal of which has already been made, has been found (No of step S1004), the processing rule setting unit 102 requests the subject node to set the processing rule (flow entry) output from the processing rule forming unit 101 via the processing rule search unit 103 (step S1006).

If the processing rule (flow entry), which competes with the processing rule (flow entry) output from the processing rule forming unit 101 and a request for removal of which has already been made, is found (Yes of step S1004), the processing rule setting unit 102 re-requests the subject node to remove the processing rule (flow entry) a request for removal of which has already been made and which is likely to produce the loop trouble (step S1005).

For example, suppose a case where, for a new processing rule (flow entry) that implements a packet forwarding route from the node 210, thence to the node 220, thence to the node 240 and thence to the node 230, in FIG. 1, such a processing rule (flow entry) whose matching rule (matching key) competes with that of the new processing rule (flow entry) and a request for removal of which has already been made exists in the node 240. In such case, the processing rule setting unit 102 re-requests the node 240 to remove the processing rule the request for removal of which has already been made ('Old rule' of FIG. 1) (step S1005).

In case a re-request has been made for removal of the processing rule (flow entry), the request for removal of which has already been made and which is likely to produce the loop trouble, the processing rule setting unit 102 adds the processing rule (flow entry), the re-request for removal of which has now been made, in the removal request history management unit 106.

After the processing rule setting unit 102 has made the re-request for removal of the processing rule (flow entry), it requests the subject node to set the processing rule (flow entry) output from the processing rule forming unit 101 via the processing rule search unit 103 (step S1006).

Finally, the processing rule setting unit 102 registers the above mentioned additionally set processing rule (flow entry) in the processing rule management unit 105.

It is thus possible to suppress the frequency of occurrence of loop troubles, otherwise caused by the processing rule (flow entry) which should have been removed but which are incidentally left over, as set out above in the data forwarding network equivalent to that of the Non-Patent Literatures 1, 2.

Exemplary Embodiment 2

An exemplary embodiment 2 of the present invention will now be described with reference to the drawings. The exemplary embodiment 2 of the present invention is based on the exemplary embodiment 1 discussed above and, in addition, sets an upper limit to the number of times of the re-requests for removal of the processing rule (flow entry). The following description is centered about the points of difference from the exemplary embodiment 1.

Figure 5:
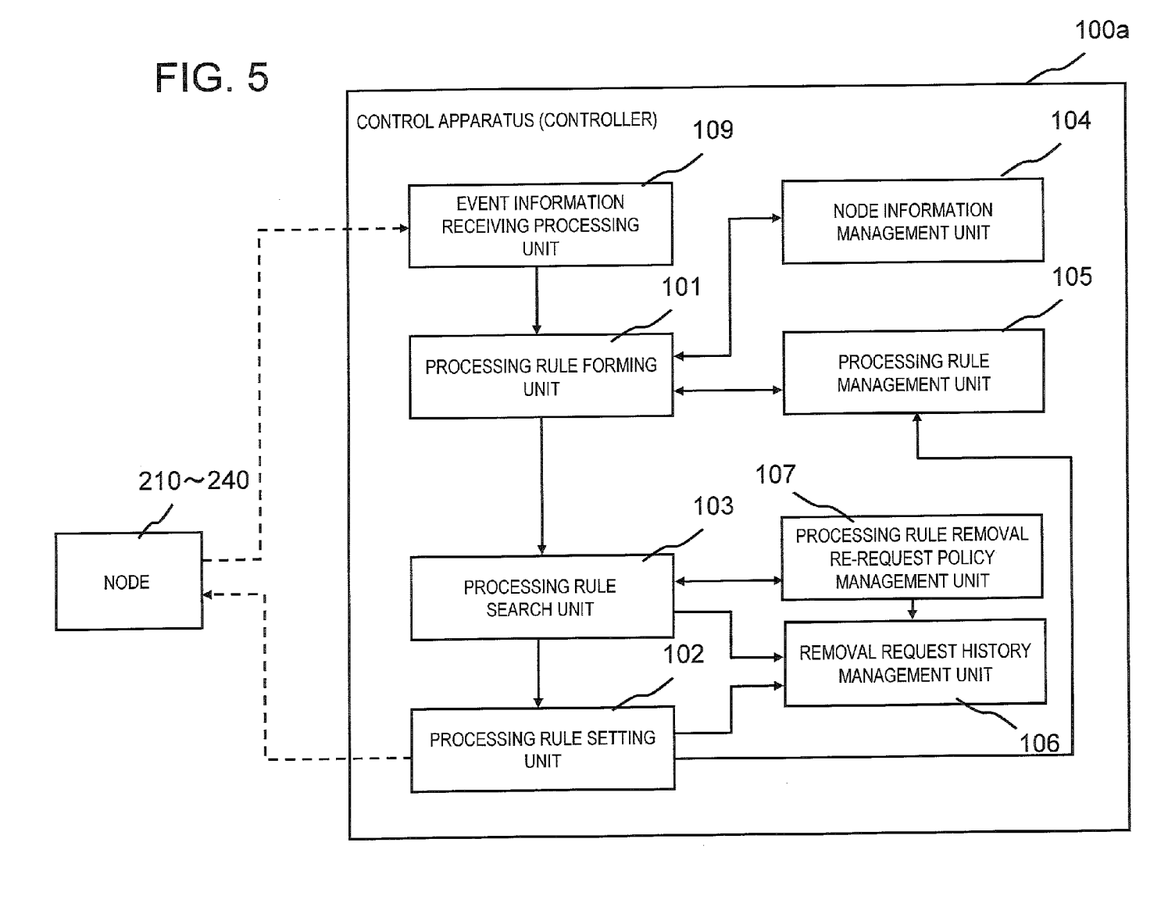
FIG. 5 is a block diagram showing a configuration of the control apparatus (controller) according to exemplary embodiment 2 of the present invention.

FIG. 5 depicts a block diagram showing the configuration of a control apparatus (controller) of the exemplary embodiment 2 of the present invention. Referring to FIG. 5, a control apparatus (controller) 100*a* of the exemplary embodiment 2 is of the configuration of the control apparatus (controller) 100 of the exemplary embodiment 1 shown in FIG. 3 added by a processing rule removal re-request policy management unit 107.

The processing rule removal re-request policy management unit 107 manages the number of times of consecutive removal re-requests in really removing the processing rule (flow entry) a request for removal of which has already been made and which will produce a loop trouble in combination with the processing rule (flow entry) output from the processing rule forming unit 101. Specifically, the processing rule removal re-request policy management unit removes the subject processing rule (flow entry) from the removal request history management unit 106 when the number of times has reached a pre-set threshold value. It is observed that the pre-set threshold value may be a value common to the nodes 210 to 240, or may also be individually set from node to node.

Figure 6:
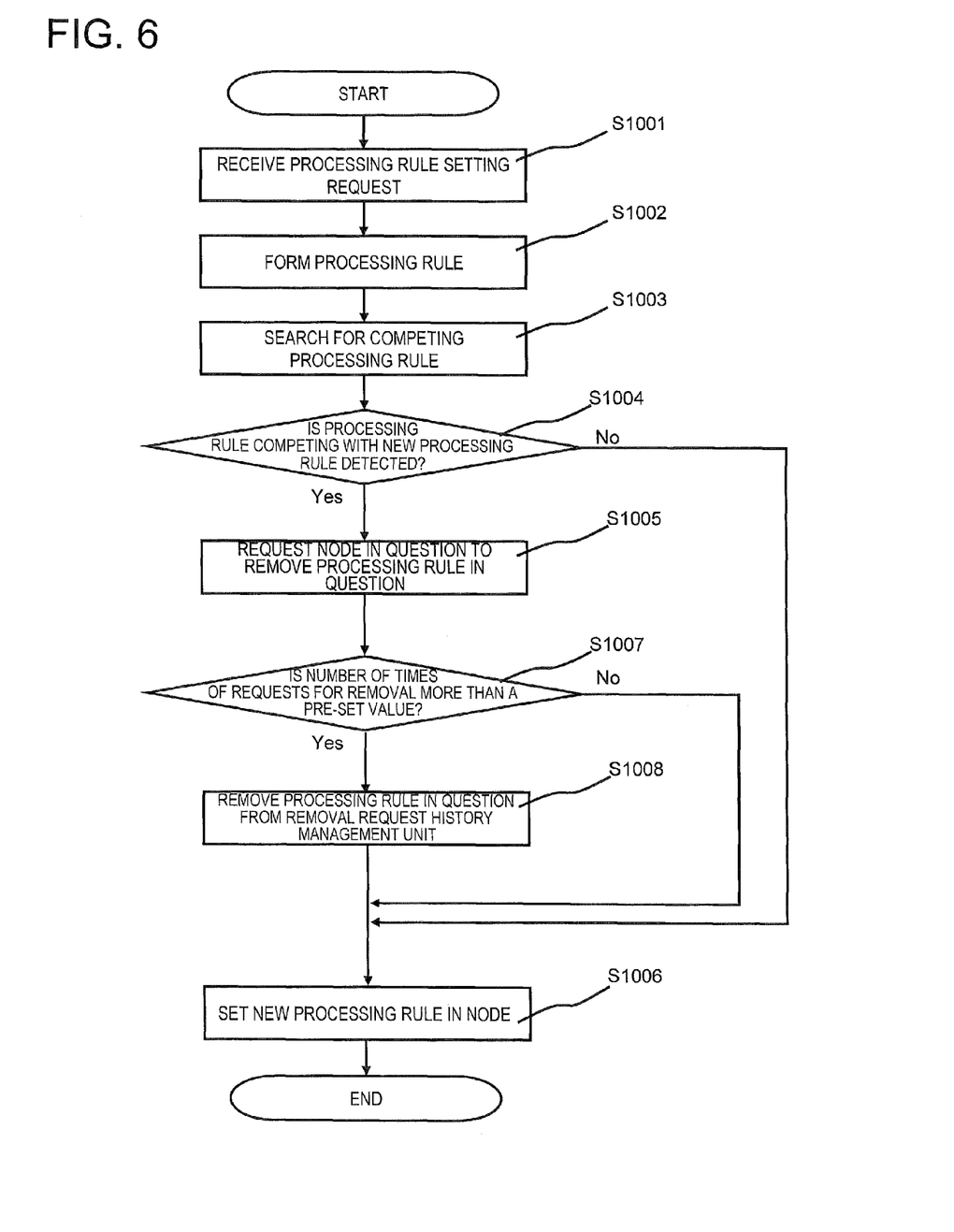
FIG. 6 is a flowchart showing the operation of the control apparatus (controller) according to exemplary embodiment 2 of the present invention.

FIG. 6 depicts a flowchart illustrating operation of the control apparatus (controller) of the exemplary embodiment 2. The processing from step S1001 up to step S1005 in FIG. 6 is similar to that from step S1001 up to step S1005 of FIG. 4 illustrating the operation of the exemplary embodiment 1.

After the re-request for removal of the processing rule (flow entry) has been made in step S1005, the processing rule removal re-request policy management unit 107 checks to see whether or not the number of times of the consecutive re-requests for removal has reached a pre-set threshold value (step S1007).

If the number of times of the re-requests for removal has reached a pre-set threshold value (Yes of step S1007), the processing rule removal re-request policy management unit 107 removes the processing rule (flow entry), re-requested for removal in step S1005, from the removal request history management unit 106 (step S1008). This suppresses next and following re-requests for removal of the processing rule (flow entry).

The subsequent operation is similar to the case of the exemplary embodiment 1, that is, the processing rule setting unit 102 requests setting the processing rule (flow entry) output from the processing rule forming unit 101 via the processing rule search unit 103 (step S1006). The same also holds when the number of times of the consecutive re-requests for removal has not reached the above mentioned pre-set threshold value.

As set out above, in the present exemplary embodiment, the upper limit is set to the number of times of re-requests for removal of the same processing rule for the same node, in order to suppress the occurrence of a situation in which re-requests for removal are repeated, in addition to the beneficent results of the exemplary embodiment 1.

Also, in the exemplary embodiment, set out above, the processing rule removal re-request policy management unit 107 removes the history of the removal request history management unit 106 based on the number of times of the re-requests for removal. It is however also possible to remove the history record(s) from the removal request history management unit 106 by setting pre-set policies such as lapse of pre-set time or surpassing of a pre-set number of entries.

Although the description has been made of preferred exemplary embodiments of the present invention, such exemplary embodiments are given only by way of illustration and are not intended to limit the scope of the present invention. That is, further modifications, substitutions or adjustments may be made without departing from the basic technical concept of the present invention. The control apparatus (controllers) 100, 100*a* may be implemented by dedicated servers, while the nodes 210 to 240 may be implemented not only by the above mentioned OpenFlow Switches but by routers in an IP network or by MPLS switches in an MPLS (Multi-Protocol Label Switching) network. The present invention may otherwise be applied to a network where a server performs concentrated management of the behavior of the nodes disposed in the network.

Preferred modes of the present invention will now be summarized below:

[Mode 1]
(See the Communication System According to the Above Mentioned First Aspect)

[Mode 2]
The communication system according to Mode 1, further comprising
a processing rule removal re-request policy management unit that removes the history record(s) from the removal request history management unit based on a pre-set policy.

[Mode 3]
The communication system according to Mode 2, wherein,
the processing rule removal re-request policy management unit removes the relevant record(s) from the removal request history management unit in case the number of times of the re-requests for removal of the processing rules competing with the new processing rule as formed by the processing rule setting unit has reached a pre-set threshold value.

[Mode 4]
The communication system according to Mode 3, wherein,
a threshold value, as set from one node to another, is used as the pre-set threshold value.

[Mode 5]
See the controller according to the above mentioned second aspect.

[Mode 6]
The controller according to Mode 5, further comprising
a processing rule removal re-request policy management unit that removes the history record(s) from the removal request history management unit based on a pre-set policy.

[Mode 7]
The controller according to Mode 6, wherein,
the processing rule removal re-request policy management unit removes the relevant history record(s) from the removal request history management unit in case the number of times of the re-requests for removal of the processing rules competing with the new processing rule as formed by the processing rule setting unit has reached a pre-set threshold value.

[Mode 8]
The controller system according to Mode 7, wherein,
a threshold value, as set from one node to another, is used as the pre-set threshold value.

[Mode 9]
(See the Node Controlling Method According to the Above Mentioned Third Aspect)

[Mode 10]
(See the Program According to the Above Mentioned Fourth Aspect)

It is observed that the Modes 9 and 10 may be extended like Mode 1 extended by Modes 2 to 4.

The exemplary embodiments may be modified or adjusted within the scope of the entire disclosure of the present invention, inclusive of claims, based on the fundamental technical concept of the invention. Moreover, various combinations or selections of elements disclosed herein may be made within the context of the claims. That is, the present invention may encompass various variations or modifications that may occur to those skilled in the art within the gamut of the entire disclosure of the present invention, inclusive of claims and the technical concept of the invention.

REFERENCE SIGNS LIST 100, 100a control apparatus (controller)
101 processing rule forming unit
102 processing rule setting unit
103 processing rule search unit
104 node information management unit
105 processing rule management unit
106 removal request history management unit
107 processing rule removal re-request policy management unit
109 event information receiving processing unit
210, 220, 230, 240 nodes
310, 320 external nodes

What is claimed is:

1. A communication system, comprising:
a node(s) that processes a packet received in accordance with a processing rule that stipulates a matching rule and processing for a packet matching to the matching rule; and
a controller,
the controller including:
a removal request history management unit that retains record(s) of past request(s) to the node(s) to remove a processing rule;
a processing rule search unit that, in setting a new processing rule for the node(s), references the removal request history management unit to search a processing rule having a matching rule competing with the new processing rule; and
a processing rule setting unit that, in case a processing rule having the matching rule competing with the new processing rule exists, re-requests the node(s) to remove the processing rule having the matching rule competing with the new processing rule,
wherein the controller further includes a processing rule removal re-request policy management unit that removes the record(s) from the removal request history management unit based on a pre-set policy,
wherein the processing rule removal re-request policy management unit removes, in case a number of times of the re-requests for removal of the processing rule(s) competing with the new processing rule as formed by the processing rule setting unit has reached a pre-set threshold value, the record(s) from the removal request history management unit.

2. The communication system according to claim 1, wherein, a threshold value, as set from one node to another, is used as the pre-set threshold value.

3. A controller, that is connected to a node(s) configured for processing a packet received in accordance with a processing rule that stipulates a matching rule and processing for a packet matching to the matching rule, the controller comprising:

a removal request history management unit that retains record(s) of past request(s) to the node(s) to remove the processing rule;
a processing rule search unit that, in setting a new processing rule for the node(s), references the removal request history management unit to search a processing rule having a matching rule that competes with the new processing rule;
a processing rule setting unit that, in case a processing rule having a matching rule competing with the new processing rule exists in the removal request history management unit, re-requests the node(s) to remove the processing rule having the matching rule competing with the new processing rule; and
a processing rule removal re-request policy management unit that removes the record(s) from the removal request history management unit based on a pre-set policy,
wherein, when a number of times of re-requests for removal of the processing rule competing with the new processing rule as formed by the processing rule setting unit has reached a pre-set threshold value, the processing rule removal re-request policy management unit removes the record(s) from the removal request history management unit.

4. The controller according to claim 3, wherein, a threshold value, as set from one node to another, is used as the pre-set threshold value.

5. A communication system, comprising:
a node(s) that processes a packet received in accordance with a processing rule that stipulates a matching rule and processing for a packet matching to the matching rule; and
a controller,
the controller including:
a removal request history management unit that retains record(s) of past request(s) to the node(s) to remove a processing rule; and
a processing rule search unit that, in setting a new processing rule for the node(s), references the removal request history management unit to search a processing rule having a matching rule competing with the new processing rule,
wherein when a number of re-requests for removal of the processing rule(s) competing with the new processing rule as formed by the processing rule setting unit has reached a pre-set threshold value, record(s) from the removal request history management are removed.

6. The communication system according to claim 1, wherein said re-request comprises a request to said node(s) to remove a processing rule which has previously been requested for removal.

7. The communication system according to claim 1, wherein said re-request comprises a subsequent request to said node(s).

8. The communication system according to claim 1, wherein said matching rule comprises a processing rule previously requested to be removed.

* * * * *